US008629775B2

(12) United States Patent
Borner et al.

(10) Patent No.: US 8,629,775 B2
(45) Date of Patent: Jan. 14, 2014

(54) TRANSMISSION OF A BINARY SWITCH POSITION

(75) Inventors: Christian Borner, Villnachem (CH); Ivan Mettler, Seewen (CH)

(73) Assignee: ABB Technology AG, Zürich (CH)

( * ) Notice: Subject to any disclaimer, the term of this patent is extended or adjusted under 35 U.S.C. 154(b) by 1360 days.

(21) Appl. No.: 12/153,760

(22) Filed: May 23, 2008

(65) Prior Publication Data

US 2008/0238212 A1 Oct. 2, 2008

Related U.S. Application Data

(63) Continuation of application No. PCT/CH2006/000580, filed on Oct. 18, 2006.

(30) Foreign Application Priority Data

Nov. 25, 2005 (EP) .................................. 05405664

(51) Int. Cl.
*G08B 13/14* (2006.01)
*G08B 21/00* (2006.01)

(52) U.S. Cl.
USPC ....................................... 340/572.4; 340/644

(58) Field of Classification Search
CPC ............ H01H 9/16; H02J 13/00; G08B 13/14
USPC ........ 340/572.4, 644; 307/112, 113; 324/425, 324/415; 327/538; 330/51
See application file for complete search history.

(56) References Cited

U.S. PATENT DOCUMENTS

| 4,260,983 | A | * | 4/1981 | Falck et al. | 340/572.4 |
|---|---|---|---|---|---|
| 5,202,589 | A | * | 4/1993 | Huser | 327/50 |
| 5,585,678 | A | * | 12/1996 | Dijk et al. | 307/112 |
| 6,232,899 | B1 | * | 5/2001 | Craven | 341/126 |
| 6,930,539 | B2 | * | 8/2005 | Erckert | 327/540 |

FOREIGN PATENT DOCUMENTS

| DE | 16 65 524 B1 | 10/1971 |
|---|---|---|
| DE | 101 18 189 A1 | 11/2002 |
| EP | 0 806 829 A | 11/1997 |
| EP | 1 026 862 A | 8/2000 |
| EP | 1 137 024 A1 | 9/2001 |

OTHER PUBLICATIONS

PCT/ISA/210 and PCT/ISA/237.

* cited by examiner

*Primary Examiner* — Nam V Nguyen
(74) *Attorney, Agent, or Firm* — Buchanan Ingersoll & Rooney PC

(57) ABSTRACT

The present disclosure relates to simplified monitoring and transmission of a binary switch position by means of coded switching, in which corrections caused by different pulse edge delays are eliminated. According to the disclosure, an auxiliary voltage which is to be transmitted when the switch position is closed is coded using two identical pulse edges of two different pulses, that is to say using either the two connection edges or the two disconnection edges of the two pulses. As a result, the previously known pulse duration modulation is replaced with modulation of the delay time between the two pulses. The two pulses mentioned can be repeatedly generated inside a basic period, which is independent of the auxiliary voltage, and have, for distinguishing purposes, a connection duration or pulse length which is different but is independent of the auxiliary voltage.

10 Claims, 1 Drawing Sheet

TRANSMISSION OF A BINARY SWITCH POSITION

RELATED APPLICATIONS

This application claims priority under 35 U.S.C. §119 to EP Application 05405664.3 filed in Europe on Nov. 25, 2005, and as a continuation application under 35 U.S.C. §120 to PCT/CH2006/000580 filed as an International Application on Oct. 18, 2006 designating the U.S., the entire contents of which are hereby incorporated by reference in their entireties.

TECHNICAL FIELD

The disclosure relates to the field of protection technology and station management technology. It relates to a method and an apparatus for transmitting a binary switch position.

BACKGROUND INFORMATION

European patent application EP-A 1 137 024 discloses an apparatus for monitoring and transmitting a switch position, for example for a high-voltage or medium-voltage switching system. FIG. 1 diagrammatically shows such an apparatus having a switch 1 which is connected to a coder 3 via an auxiliary voltage source 2. The coder 3 is connected to a decoder 5 via a transmitting means 4. The apparatus has the task of monitoring the position of the switch 1 and transmitting a level $U_0$ of the auxiliary voltage, the coder 3 and the decoder 5 being DC-isolated by the transmitting means 4 comprising optical components, for example.

In this case, when the switch 1 is closed, the coder 3 is supplied with electrical energy solely by the auxiliary voltage source 2. The coder 3 generates a pulse-duration-modulated pulse sequence having a particular connection duration or pulse length, the connection duration being a function of the auxiliary voltage $U_0$. For any desired small value of the auxiliary voltage $U_0$, the connection duration is 50%, that is to say a pulse length corresponds to exactly half the cycle time. For increasingly large values of the auxiliary voltage $U_0$, the connection duration decreases but does not undershoot a predefined minimum connection duration. The presence of the pulse-duration-modulated signal thus signifies that the switch is closed, and the connection duration indicates the value of the auxiliary voltage $U_0$. The pulse-duration-modulated pulse sequence can be generated in a module specifically configured for coding (Application Specific Integrated Circuit ASIC). A module which is specifically configured for decoding and is independent of a downstream microprocessor (Field Programmable Gate Array FPGA) may likewise be provided for detecting and evaluating the signals.

The transmitting means for the pulse-duration-modulated signal suitably comprise an optocoupler which transfers an input current $I_{opto}$ coming from the coder to an output voltage $U_{opto}$ to be processed by the decoder. In the previously known pulse duration modulation method, it should be taken into account that a connection edge and a disconnection edge of a pulse are delayed differently by the optocoupler, in particular on the basis of the temperature, which may result in inaccuracies when determining the relevant times and thus the pulse length. For this reason, a delay of, for example, a rising edge of the output voltage of the optocoupler may be measured when calibrating the monitoring apparatus and a corresponding correction value may be introduced for operation.

SUMMARY

Exemplary embodiments disclosed herein can simplify monitoring and transmission of a binary switch position by means of coded switching and to reduce corrections caused by a different pulse edge delay. A method and an apparatus for transmitting a binary switch are disclosed.

A method for transmitting a binary switch position of a switch is disclosed, in which, when the switch position is closed, an auxiliary voltage is applied to a coder and the coder generates a sequence of pulses, which codes the level of the auxiliary voltage, for transmission to a decoder, wherein the level of the auxiliary voltage is jointly coded using a delay time between identical edges of two successive pulses with different pulse lengths.

In another aspect, a method is disclosed for transmitting a binary switch position of a switch, the method comprising: when the switch position is closed, an auxiliary voltage is applied to a coder; the coder generates a sequence of pulses, which codes the level of the auxiliary voltage; and transmitting the sequence of pulses to a decoder, wherein the coding of the level of the auxiliary voltage is based on a delay time between identical edges of two successive pulses with different pulse lengths.

An apparatus for transmitting a binary switch position of a switch to a decoder is disclosed, said apparatus comprising a coder which is supplied with an auxiliary voltage when the switch position is closed and codes said auxiliary voltage using a pulse sequence, wherein the coder is configured to generate two successive pulses which have different pulse lengths and jointly code the level of the auxiliary voltage using a delay time between identical edges of the pulses.

BRIEF DESCRIPTION OF THE DRAWINGS

The disclosure is explained in more detail below using exemplary embodiments in connection with the drawings, in which.

The reference symbols used in the drawings are summarized in the list of reference symbols. In principle, identical parts are provided with the same reference symbols.

DETAILED DESCRIPTION

The essence of the disclosure is to eliminate the inaccuracy caused by evaluating the two differently delayed pulse edges of a single pulse by coding an auxiliary voltage, which is to be coded when the switch position is closed, using two identical pulse edges of two different pulses, that is to say using either the two connection edges or the two disconnection edges of the two pulses. As a result, the previously known pulse duration modulation is replaced with pulse frequency modulation.

The two pulses mentioned can be generated repeatedly within a basic period, which is independent of the auxiliary voltage, and have, for distinguishing purposes, a connection duration or pulse length which is different but is independent of the auxiliary voltage.

Figure 1:
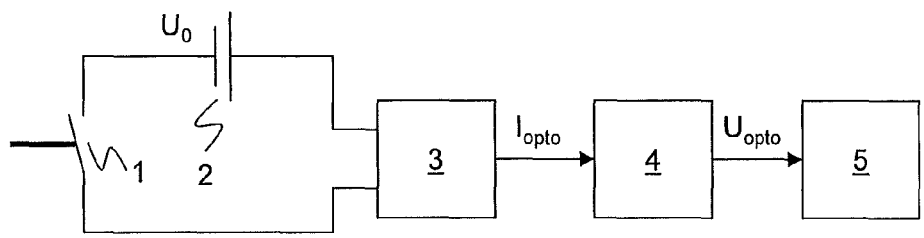
FIG. 1 diagrammatically shows an apparatus for transmitting a switch position.

FIG. 1 shows a block diagram of an apparatus for monitoring and transmitting the switch position of a switch 1. In a feed or battery circuit, the switch 1 is connected to an auxiliary voltage source 2 which generates a constant auxiliary voltage $U_0$. When the switch 1 is closed, the auxiliary voltage $U_0$ is applied to a coder 3 which is connected to the switch 1 and to the auxiliary voltage source 2. The coder 3 detects the binary switch position of the switch 1 and converts this information into an electrical signal. This electrical signal is transmitted by a transmitting means 4, e.g., an optocoupler, to a DC-isolated secondary side. The transmitted signal is evaluated by a decoder 5 on this secondary side, that is to say the coding of the auxiliary voltage is reversed to pulse duration modulation or decoded in the decoder 5, as a result of which the switch position of the switch 1 is not only transmitted in a manner independent of the auxiliary voltage but information relating to the level of the auxiliary voltage $U_0$ can also be simultaneously transmitted.

The switch 1 is, for example, an auxiliary switch of a high-voltage switch and is mechanically coupled to the latter, with the result that the position of the high-voltage switch can be easily inferred from the position of the auxiliary switch. Such auxiliary switches are very important but nevertheless make it possible to monitor a high-voltage switch at a low power level. In order to monitor a plurality of switches, a corresponding number of coders 3 and transmitting means 4 may be arranged on a printed circuit board, the respective separate output voltages $U_{opto}$ of the optocouplers being evaluated, e.g., by a single decoder 5.

Figure 2:
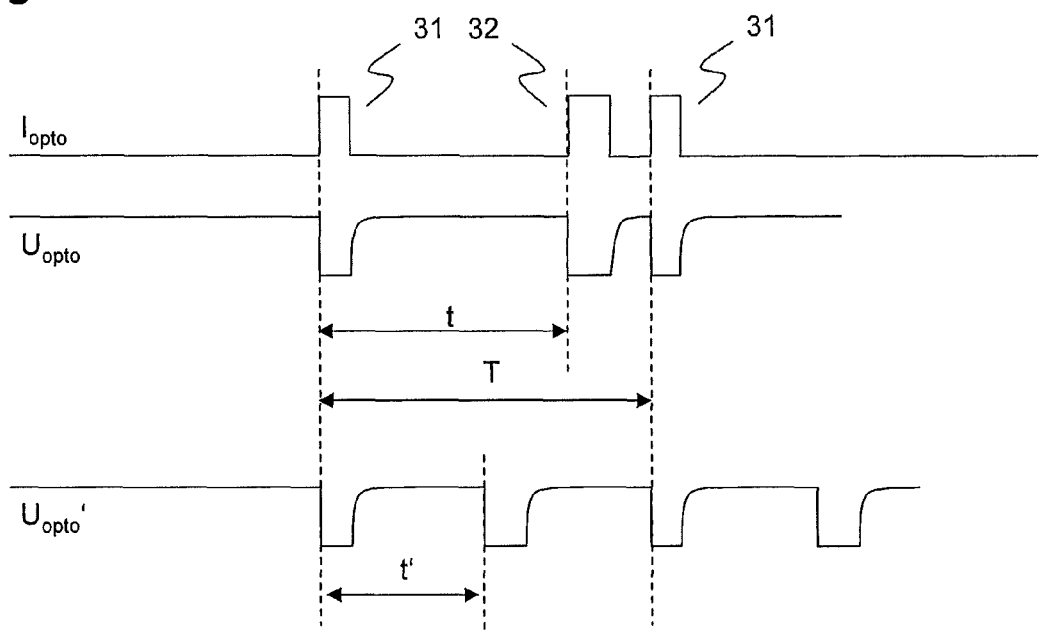
FIG. 2 shows a first and a second temporal profile of pulse-frequency-modulated signals.

The auxiliary voltage $U_0$, which is applied to the input of the coder 3 when the switch is closed, is converted by said coder into a pulse-frequency-modulated pulse sequence whose delay time or coding time t depends on the level of the auxiliary voltage $U_0$ over a characteristic curve. In order to detect and evaluate the arriving pulse sequences, the characteristic curve is also known to the decoder. FIG. 2 shows exemplary pulse sequences, in particular, at the very top, a temporal profile of a first pulse-frequency-modulated current signal $I_{opto}$ which is used to drive an optocoupler. In a manner corresponding to the current signal $I_{opto}$, a voltage signal $U_{opto}$ having the profile shown in the middle of FIG. 2 is produced at the output of the optocoupler. The connection edges of two successive pulses 31, 32 of the voltage signal $U_{opto}$ define the delay time t. After in each case a basic period or cycle time T which is independent of the auxiliary voltage, the two pulses 31, 32 are generated again. A connection duration or pulse length of the first or starting pulse 31 is slightly shorter than the connection duration of a second or delayed pulse 32, as a result of which the two pulses can be distinguished in the decoder and unambiguous determination of the delay time becomes possible. The very bottom of FIG. 2 shows a temporal profile of a second voltage signal $U_{opto}'$ for a second value of the auxiliary voltage $U_0'$. The latter is lower than the first value and is coded using a shorter delay time t' between two identical signal edges.

Figure 3:
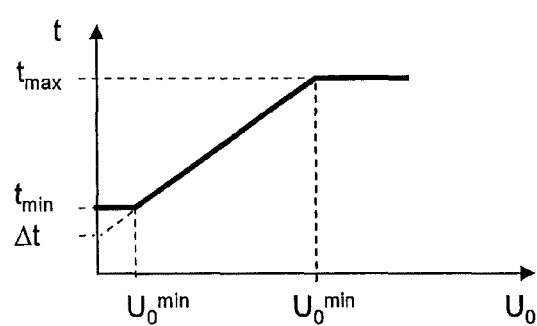
FIG. 3 shows a characteristic curve of a delay time on the basis of an auxiliary voltage.

FIG. 3 finally shows an example of the abovementioned characteristic curve for coding the auxiliary voltage $U_0$ as a delay time t of a pulse-frequency-modulated signal. In this case, the delay time t rises linearly with the auxiliary voltage $U_0$ between a minimum value $U_0^{min}$ and a maximum value $U_0^{max}$. Values below $U_0^{min}$ and above $U_0^{max}$ are represented by a minimum $t_{min}$ or maximum $t_{max}$ delay, respectively. In this case, an offset $\Delta t$ causes the pulse length of the starting pulse 31 to be shorter than the minimum delay $t_{min}$. Furthermore, the pulse length of the delayed pulse 32 is shorter than the difference between the basic period T and the maximum delay $t_{max}$.

In the case of the conventionally used auxiliary voltages of 24 V to 250 V DC, the limit values of the auxiliary voltage range $U_0^{min}$, $U_0^{max}$ are selected to ensure adequate transmission of information and with sufficient reserve for any fluctuations, for example $U_0^{min}=15$ V and $U_0^{max}=221$ V. The last-mentioned upper limit value corresponds only to a good 80% of a maximum battery voltage and causes all higher auxiliary voltage values to be coded using the upper limit value. In return, this loss of information allows resolution of the auxiliary voltage using an 8-bit A/D converter with 1 V per bit.

The delay time t is indicated in fractions of the basic period T; in the case of a resolution of 8 bits, for example, $t_{min}$ is set at 21/256 and $t_{max}$ is set at 227/256, with the result that the delay between the stated limit values is respectively increased by T/256 per 1 V. Additional calibration of an oscillator and a reference in the fabrication process makes it possible to directly measure the delay time t without a value of the basic period T also having to be determined for this purpose.

During closing of the contacts of the switch, the coder ensures that the contacts of the switch frit by means of an initial current pulse in the feed or battery circuit. As a result, an insulating film which is possibly present on the contact areas is destroyed and a reliable contact behavior of the switch is ensured. Such an initial current pulse of an intensity of 15 mA and a duration of 10 ms, for example, generally exceeds the duration of the basic period T of typically 600 µs by a multiple.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Switch
2 Auxiliary voltage source
3 Coder
4 Transmitting means
5 Decoder

What is claimed is:

1. A method for transmitting a binary switch position of a switch comprising:
    when the switch position is closed, applying an auxiliary voltage to a coder; and
    generating, at the coder, a sequence of pulses, which codes a level of the auxiliary voltage, for transmission to a decoder, wherein the level of the auxiliary voltage is jointly coded using a delay time between identical edges of two successive pulses with different pulse lengths such that the delay time depends on the level of the auxiliary voltage.

2. The method as claimed in claim 1, wherein the two pulses are respectively generated again after a basic period which is independent of the level of the auxiliary voltage.

3. The method as claimed in claim 1, wherein the delay time is given by a characteristic curve which rises linearly with the level of the auxiliary voltage and the extrapolation of which toward the auxiliary voltage value of zero results in a positive offset.

4. The method as claimed in claim 3, wherein, during closing of the switch, the coder generates an initial current pulse in a feed circuit comprising the coder and the switch.

5. The method as claimed in claim 1, wherein, during closing of the switch, the coder generates an initial current pulse in a feed circuit comprising the coder and the switch.

6. An apparatus for transmitting a binary switch position of a switch to a decoder, said apparatus comprising:
    a coder which is supplied with an auxiliary voltage when the switch position is closed and codes said auxiliary voltage using a pulse sequence, wherein the coder is configured to generate two successive pulses which have different pulse lengths and jointly code the level of the auxiliary voltage using a delay time between identical edges of the pulses, such that the delay time depends on the level of the auxiliary voltage.

7. A method for transmitting a binary switch position of a switch, the method comprising:
when the switch position is closed, applying an auxiliary voltage to a coder;
generating, at the coder, a sequence of pulses, which codes a level of the auxiliary voltage; and
transmitting the sequence of pulses to a decoder, wherein a delay time between identical edges of two successive pulses depends on the level of the auxiliary voltage, and wherein said two successive pulses have different pulse lengths.

8. The method as claimed in claim 7, wherein the two pulses are respectively generated again after a basic period which is independent of the level of the auxiliary voltage.

9. The method as claimed in claim 8, wherein the delay time is given by a characteristic curve which rises linearly with the level of the auxiliary voltage and the extrapolation of which toward the auxiliary voltage value of zero results in a positive offset.

10. The method as claimed in claim 9, wherein, during closing of the switch, the coder generates an initial current pulse in a feed circuit comprising the coder and the switch.

* * * * *